May 12, 1970 Z. J. JAGIEL 3,511,360
TROUGH CONVEYOR FOR CONTAINERS
Filed May 31, 1968 4 Sheets-Sheet 1

INVENTOR.
ZIGMUND J. JAGIEL
BY
ATTORNEY

May 12, 1970            Z. J. JAGIEL            3,511,360

TROUGH CONVEYOR FOR CONTAINERS

Filed May 31, 1968            4 Sheets-Sheet 2

INVENTOR.
ZIGMUND J. JAGIEL

BY

ATTORNEY

May 12, 1970  Z. J. JAGIEL  3,511,360
TROUGH CONVEYOR FOR CONTAINERS

Filed May 31, 1968  4 Sheets-Sheet 3

INVENTOR.
ZIGMUND J. JAGIEL
BY Hugh A. Kirk
ATTORNEY

May 12, 1970  Z. J. JAGIEL  3,511,360
TROUGH CONVEYOR FOR CONTAINERS
Filed May 31, 1968  4 Sheets-Sheet 4

INVENTOR.
ZIGMUND J. JAGIEL
BY
*Hugh L. Kirk*
ATTORNEY

United States Patent Office 3,511,360
Patented May 12, 1970

3,511,360
TROUGH CONVEYOR FOR CONTAINERS
Zigmund J. Jagiel, Toledo, Ohio, assignor of one-half to Hugh A. Kirk, Toledo, Ohio
Filed May 31, 1968, Ser. No. 733,396
Int. Cl. B65g 17/38, 15/62
U.S. Cl. 198—189                21 Claims

ABSTRACT OF THE DISCLOSURE

A rectangular U-shaped trough conveyor for containers, such as bottles and cans, made of a low coefficient of friction material, such as a fiber glass reinforced plastic, having a sprocket type chain guided usually off-center along the bottom of the trough so that the containers are tilted slightly in their movement as they rest on the chain. The sides of the trough may be adjustable laterally for different sized containers. Means may also be provided for varying the speed of the conveyor chain, and at the ends of the trough the chain may be centered, or supports may be provided on both sides of the chain so that the containers will not tip over when they leave the supporting sides of the trough. Troughs may be multipled in parallel or in series, and adjacent ends of troughs in series may be connected by short straight or arcuate trough sections without the need for a conveyor chain in such sections.

BACKGROUND OF THE INVENTION

Previously such conveyors were generally made of metal, such as stainless steel, and were provided with special conveyor chains guided in open bottom channels, which chains required special flat container supporting surfaces and/or pushers and were adapted for angular movement or being in a horizontal as well as a vertical plane. The links and their connections for such chains were comparatively expensive and took considerable shut-down time to repair and replace. Also such conveyors usually did not provide integral trough means for confining or collecting any spillage from the containers they conveyed.

SUMMARY OF THE INVENTION

Generally speaking, a conveyor according to this invention comprises a trough having a rectangular U-shaped cross-section with a continuous bottom and relatively high parallel sides, and usually in substantially straight lengths. This trough is usually formed of a fiber glass reinforced plastic and may be made of two parallel L channel sections that may be adjustably bolted together through slots or a combination of slots and apertures in their bottom flanges to be readily adapted for different width containers. The distance between the parallel vertical sides of the trough is preferably slightly greater, that is between about 5% and 10% greater, than the width of the containers it is to convey.

Along the bottom of the trough there slides a conveyor chain upon which the bottles rest, and this conveyor chain is preferably offset to one side of the center of the bottom of the trough adjacent a guide strip so that as the containers rest on the chain they tilt slightly, thereby only contacting one of the side walls at one point on each container. This not only reduces the friction between the containers and the trough as they are being moved, but also prevents the scratching off of labels or identifying markings that may be on the container below this point of contact. Furthermore, the fact that the sides and bottom of the trough are made of a low coefficient material, namely a fiber glass reinforced plastic, no lubrication of the trough, the containers, or the chain is required.

The chain is usually an ordinary sprocket chain which may be easily repaired and replaced and is not of special manufacture. Its relatively rough surface provides adequate friction with the bottom of the containers for preventing the containers from slipping thereon, particularly in view of the fact that all of the containers in the trough are similarly supported by the chain. This chain may be driven by sprocket wheels at the ends of each straight section of trough, and these sprocket wheels may be mounted on shafts one of which may be driven by a sprocket chain and/or other gearing driven by a motor which may also include a variable speed drive.

The guide for the chain may be a separate strip or it may be the end or edge of one of the flanges of one of the L-shaped channel sides. However, its thickness should not be greater, and preferably slightly less than the thickness of the chain, so that each container will be substantially completely supported by the chain. At the ends of the trough, the chain may be guided toward the center of the bottom of the trough by a wider and/or an additional guide strip on the other side of the chain, so that the containers will be moved into an erect non-tilted position when they leave the sides of the trough.

Since each container is supported by the chain, a series of adjacent containers moving in the trough of this invention usually has sufficient push to move about the same number of containers through a bridging trough section without a chain between two trough conveyors connected seriatim, whether the bridging trough is straight or curved. Thus a standard type sprocket chain which does not have much lateral flexibility in a horizontal plane may be used in a continuous loop in a vertical plane.

Trough conveyors according to this invention are primarily used in canning and bottling and container manufacturing plants for conveying the containers to and from fillers, packers, washers, twisters, dumpers, cappers, labellers, and the like. Also these trough conveyors may be multipled in parallel for feeding aligned parallel rows of containers into a case packaging machine.

Objects and advantages

Accordingly, it is an object of this invention to produce a simple, efficient, economic, effective, wear resistant, low coefficient of friction trough shaped chain type conveyor for containers, such as bottles and cans, which may be adjustable in width for different size containers, is easy to clean, and has continuous bottom and sides for catching and confining drippings from the containers.

Another object is to provide a trough conveyor having a chain so located along its bottom that the bottles are substantially completely supported by the chain in a slightly tilted position, so that the sides of the trough only contact substantially one spot on each container to reduce the friction between the conveyor trough and the containers, as well as prevent the rubbing off of labels or other markings on the sides of the containers.

Another object is to provide such a conveyor which is relatively easy and simple to produce, repair, replace, and multipled in parallel and/or series, and which uses a simple sprocket type chain which does not require bendability in more than one plane.

BRIEF DESCRIPTION OF THE VIEWS

The above mentioned and other features, objects and advantages of this invention and the manner of attaining them are described more specifically below in reference to embodiments thereof shown in the accompanying drawings, wherein.

DETAILED DESCRIPTION OF PREFERRED EMBODIMENTS

Figures 1, 2:
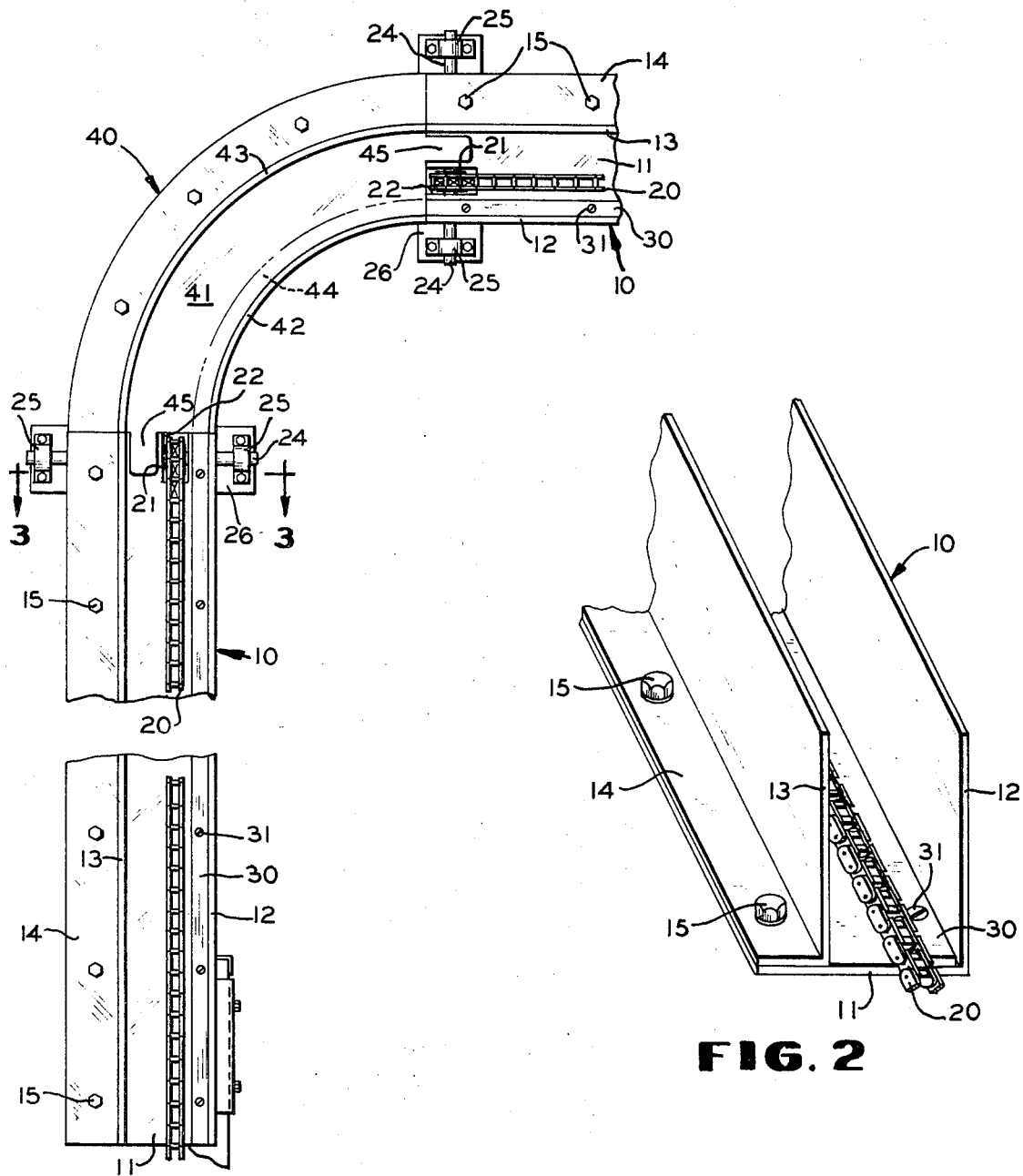
FIG. 1 is a plan view of a series of two trough conveyors according to one embodiment of this invention, with parts broken away, connected by an arcuate trough section.
FIG. 2 is a perspective view of one end of one of the trough conveyors shown in FIG. 1.

Referring first to the embodiment in FIGS. 1 through 4 there is disclosed a trough 10 having a substantially rectangular U-shaped cross-section with a substantially continuous bottom portion 11 and parallel side portions 12 and 13, respectively. In this particular embodiment the bottom portion 11 and one of the sides 12 are formed integrally of one L-shaped cross-sectional piece of solid material, which preferably is of fiber glass reinforced plastic, however, it may be made of other low coefficient of friction material, including a metal such as stainless steel. The other parallel side portion 13 is shown in this embodiment to be provided with a lower flange portion 14, also forming a piece of L-shaped cross-section, in which the bottom flanged portion 14 is parallel with the free outer end or edge of the bottom section 11. This flanged portion 14 then may be clamped to this end or edge by a series of spaced bolts 15 with nuts 16 (see FIGS. 3 and 4), and one or both of the parallel adjacent edge and flange portions 11 and 14; herein the bottom portion 11, may be provided with elongated apertures or slots 17 (see FIG. 3) by which the distance between the two parallel wall portions 12 and 13 of the trough conveyor 10 may be adjusted for different size and/or width containers B. Also some or all of the bolts 15 may be sufficiently long to clamp the trough 10 to a support or table, or if desired other apertures may be provided in the bottom of the flange portion 11 for such support mounting bolts.

Figure 3:
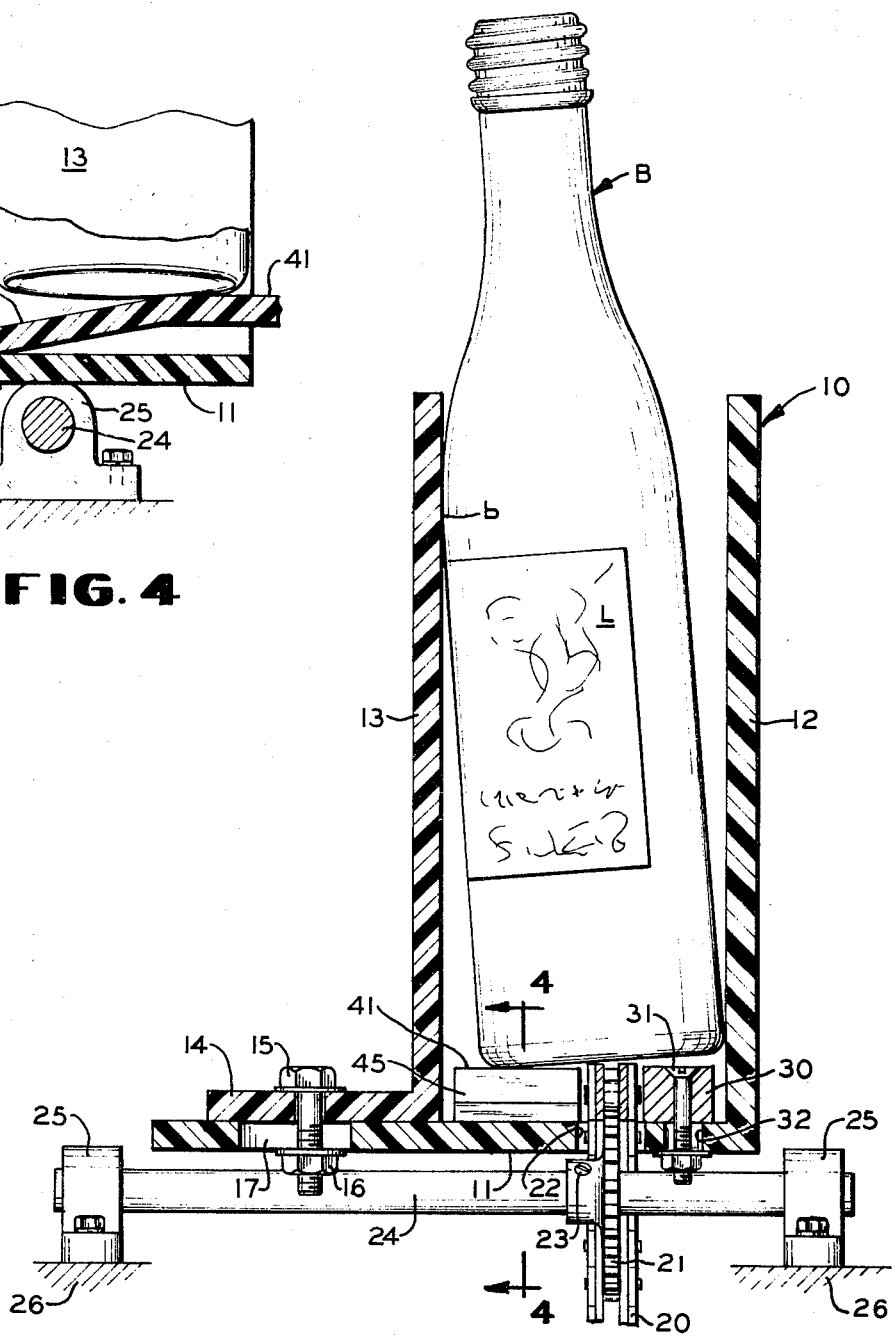
FIG. 3 is an enlarged vertical section taken along line 3—3 of FIG. 1 near the end of one of the trough conveyors.

Sliding along the bottom portion 11 of the trough, offset from the center thereof, is a conveyor chain 20, such as a sprocket chain, which has a rough surface and upon which the containers, such as bottles B, are substantially completely supported (see FIG. 3). This chain 20 is guided off-center along the trough by the sprocket wheels 21 which may be mounted at opposite ends of the trough section 10, or in a notch 22 at an end of the trough. These sprocket wheels 21 may be axially adjustably mounted by set screws 23 on shafts 24 journalled at their ends in bearings 25 mounted on the conveyor support or table portion 26.

Also the chain 20 may be guided along its off-center line along the bottom 11 of the trough 10 by a guide strip 30 along one side edge of which the sprocket chain 20 may slide. This guide strip 30 may be made of various widths, or it may be laterally adjustable from the wall 12, such as by bolts 31 countersunk into holes in the top thereof and adjustable in slots 32 provided in the bottom portion 11. The thickness of the guide strip 30 is preferably slightly less than the thickness of the chain 20 so that the containers such as the bottles B are substantially completely supported by the chain 20 (see FIG. 3).

Since the conveyor chain 20 is off-center from the halfway line between the two sides 12 and 13, and since the distance between the two parallel sides 12 and 13 is about 5% to 10% greater than the width of the containers B, the containers B which rest on the chain 20 are tilted slightly so they usually only contact one side 13 of the trough in one position $b$ at the shoulder of a bottle or near the top of the container. This materially reduces the friction between the containers B and the sides of the trough 10 as well as prevents the markings or labels L on the container from contacting the sides 12 and 13 of the trough and being rubbed off.

Furthermore, since the trough 10 of the sides 12 and 13 as well as the bottom 11 are made of fiber glass reinforced plastic they have a very low coefficient friction, and a very high resistance to wear for the sides of glass containers, as well as for the metal sprocket chain 20. Thus no lubrication is required, and the conveyor may be kept clean, particularly as is required for containers for food. And, in case of a jam-up of the containers in the trough 10, the conveyor chain 20, since each container only rests on it, may slide under the containers without smashing or breaking any of them.

On the other hand, since each container is substantially completely supported by the chain 20 and each container is touching the adjacent containers to it in the trough, they can push substantially as many containers in a line off the end of the trough 10 as remain on the chain 20 in the trough. Other shaped bridging trough sections may be used, such as straight sections and other angles of arcs than the 90° section 40 shown. These bridging sections may comprise two L-shaped cross-sectional channels also made of fiber glass reinforced plastic and so molded, and have a bottom 41 and parallel sides 42 and 43 as the trough 10, and likewise may have the side 43 adjustable as previously described and shown in FIG. 2. Thus no additional conveyor chain is required to convey the containers around any curves, materially reducing the expense required for the chain of the conveyor and enabling any sprocket type of chain to be used.

Figure 4:
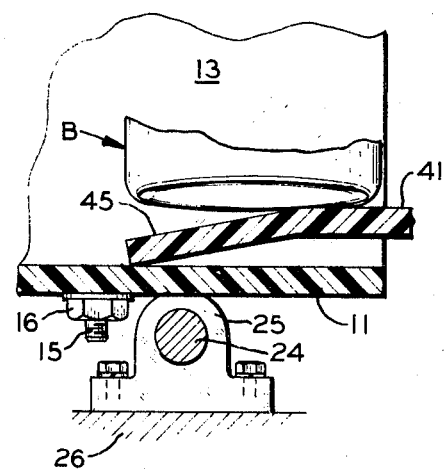
FIG. 4 is a vertical section taken along the line 4—4 of FIG. 3 showing how a tilted container may be erected as it nears the end of a trough conveyor.

Since the bridging trough section 40 does not require a conveyor chain 20, neither does it require a guiding strip 30, however, an arcuate strip 44 (shown in phantom) may be provided therein. For the junction between the adjacent ends of the troughs 10 and 40, if the container is not to tip or bounce off the end of the conveyor chain 20, the level of the bottom portion 41 of the trough section 40 may be raised to substantially the same level as the top of the conveyor chain 20 as shown in FIGS. 3 and 4, and there may also be provided ramps or tongue sections 45 (see FIG. 4) that may extend into the ends of the troughs 10 along the opposite side of the sprocket wheels 21 and chains 20 from the guide strip 30. Also, if the end of the trough conveyor discharges the containers B on to a flat table or platform where there are no side guides, it is desirable that tongues such as 45 be provided between the conveyor and the surface of the table or platform to insure the upright position of the container as it leaves the trough 10, and thus will not tip over.

Figure 5:
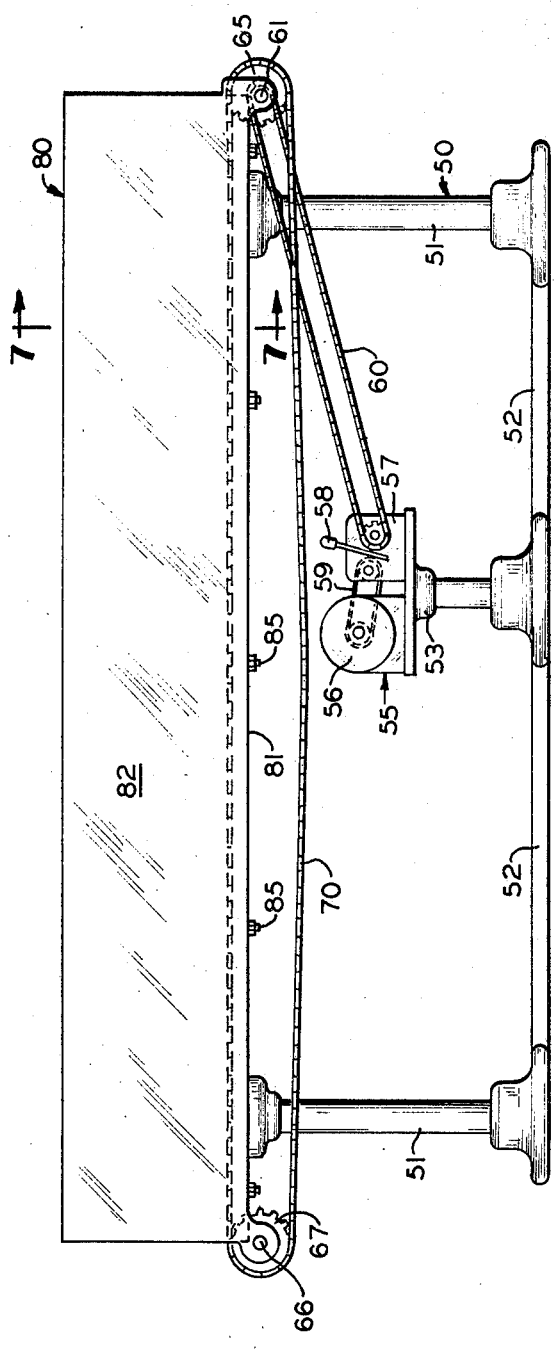
FIG. 5 is a side elevation view of another embodiment of the trough conveyor of this invention, multipled in parallel, and mounted on a support, with a driving mechanism therefor.
Figure 6:
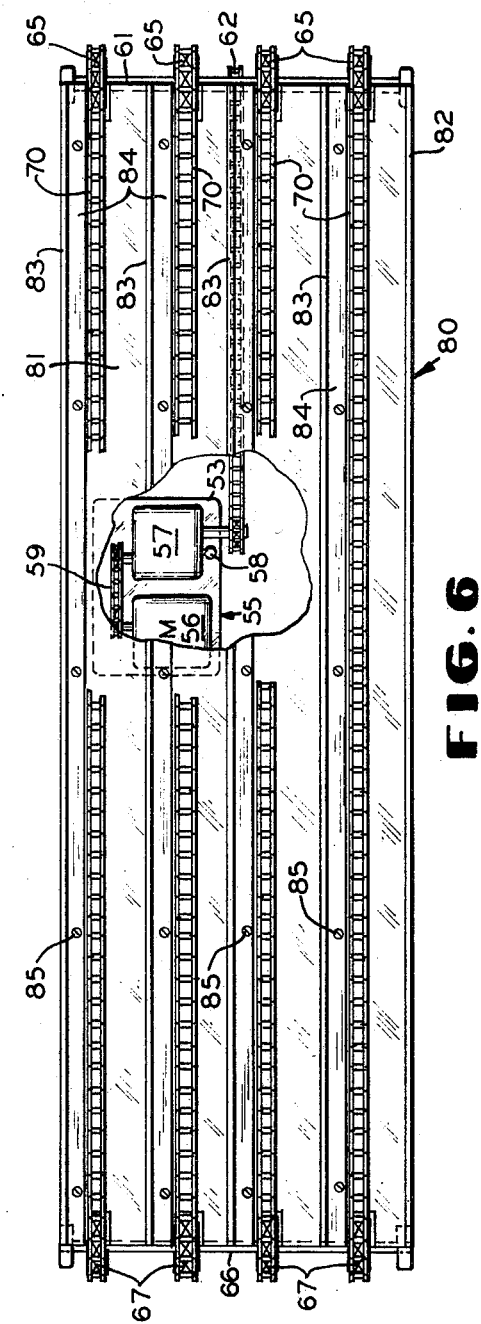
FIG. 6 is a top plan view of the multipled trough conveyor shown in FIG. 5 with a part broken away to show the location of the drive mechanism therefor.
Figure 7:
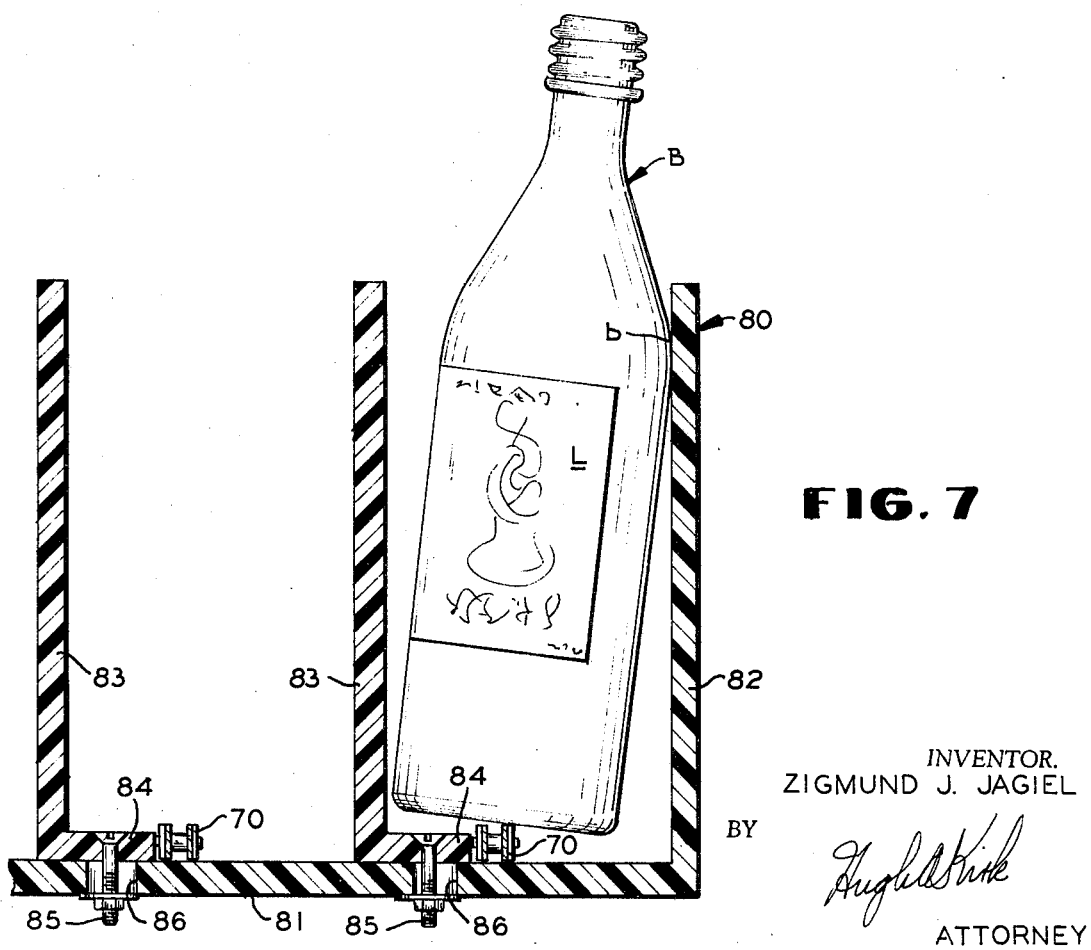
FIG. 7 is an enlarged vertical section taken along line 7—7 of FIG. 5.

Referring now to FIGS. 5 through 7, there is shown another embodiment of the trough conveyor of this invention, which may be readily adapted to a parallel multiple conveyor. A side elevation of a plurality of such a multiple conveyor is shown in FIG. 5 mounted on a table 50 having pedestals 51 which may be tied together by brace members 52, and have supported intermediate thereof an additional platform 53 upon which the driving mechanism 55 is mounted. This mechanism 55 may comprise a motor 56 and a variable speed box 57 which may be controlled by a lever 58. The speed box may be connected to the motor 56, such as by a sprocket chain 59, and the drive from the speed box 57 may be through another sprocket chain 60 or by other gearing directly to one of the end shafts 61, upon which is mounted a sprocket wheel 62 for the drive chain 60. Also fixed to this shaft 61 are a plurality of spaced sprocket wheels 65 (see FIG. 6) which drive and guide the conveyor chains 70 in each of the parallel troughs 80. The opposite end of the parallel conveyor trough sections 80 are provided with a shaft 66 similar to shaft 61 with similarly spaced sprocket wheels 67 for the opposite reaches or ends of the loops of chains 70.

In this embodiment all of the conveyor troughs 80 may have a common bottom section or flat plate 81, preferably also made of a low coefficient of friction and high wear resistant material, such as fiber glass reinforced plastic. Since this plate 81 may be molded, it also may be molded to include integrally therewith one of the side members 82 as shown in FIG. 7. However, this member 82 may be bolted thereon similar to the side member 83 having a flange portion 84, similar to the member 13 with flange 14 shown in the embodiment of FIGS. 1 through 4. Furthermore if desired, the lower flange portion 84 of the side members 83 may also act as the guide strip for the off-center conveyor chains 70 (see FIG. 7), and these flanges then may be anchored by countersunk bolts 85 into slots 86 provided in the bottom plate 81. In this instance the thickness of the flange portions 84 is preferably less than the thickness of the conveyor chain 70 so that the container, such as bottle B shown in FIG. 7, will be substantially completely supported by the chain 70. Also the distance between the two side walls of each parallel conveyor trough section, namely the sides 82 and 83, is slightly wider than the width of the containers or bottles B to be conveyed thereby, so that they will tilt as shown in FIG. 7. However, if desired this tilt is not necessary, particularly in the event this parallel multiple trough conveyor is for a case packing machine, wherein four or more aligned rows of bottles are to be introduced into a packing case. Then the chains 70 are centered along the bottoms of the troughs 80 by additional guide strips, such as 30 shown in FIG. 3; provided on the other sides of the conveyor chains 70 from the flanges 84. This is only done along this multiple conveyor, however, just before the containers or bottles B are introduced into the case packing machine, so that as little friction as possible between the bottles and the side of the conveyor troughs 80 will occur throughout the whole length of this multiple conveyor.

If desired, the features of the embodiment shown in FIG. 7 may also be incorporated into the embodiment shown in FIGS. 1 through 4, namely employing the flange on the movable wall section 83 also as the guide strip for the chain, without departing from the scope of this invention.

Figure 8:
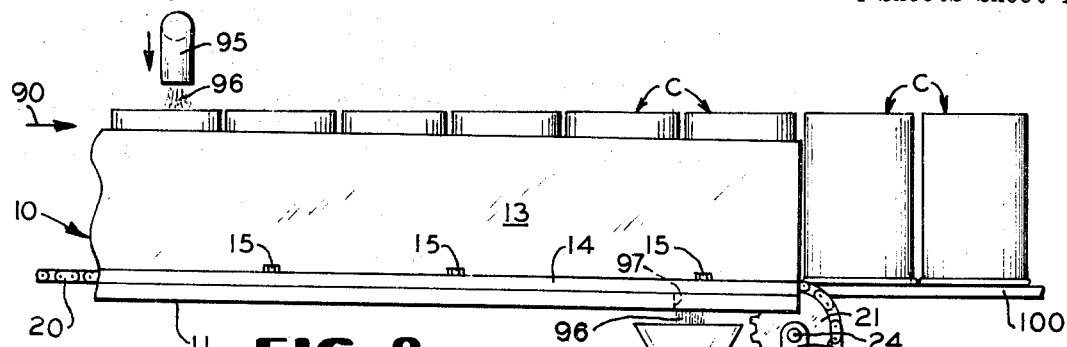
FIG. 8 is a schematic side elevation of a trough conveyor similar to that shown in FIG. 1 with parts broken away, and adapted for use in a continuous can filling machine.
Figure 9:
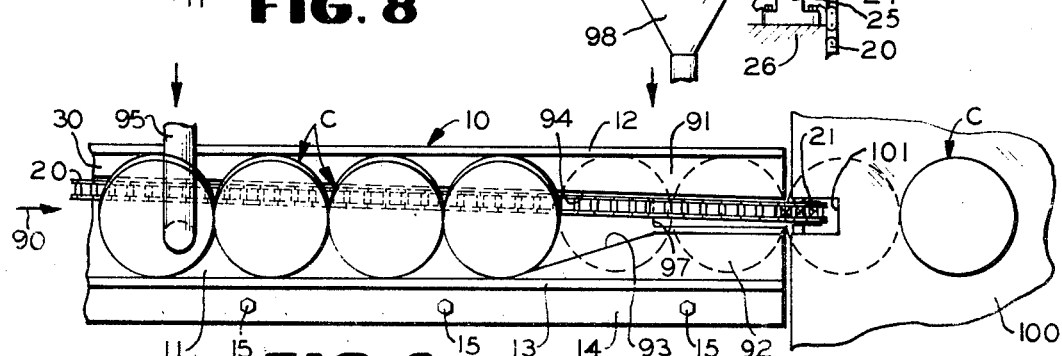
FIG. 9 is a top plan view of the trough conveyor used in the machine shown in FIG. 8.

Referring next to FIGS. 8 and 9, there is schematically shown the employment of a trough conveyor similar to that shown in the embodiments of FIGS 1 through 4, in a filling machine for cans C. As the cans C move in the direction of the arrow 90, the guide strip 30 for the sprocket conveyor chain 20 gradually increases in width as shown in 91 in FIG. 9, so as to center the chain 20 at the right end of the conveyor trough 10. At that end there is also provided an additional guide strip 92 for the other side of the chain. This guide strip 92 has a slanting edge 93 so that any drippings from the filling spout 95, which continuously flows liquid 96 as the adjacent cans C pass under it, will collect in the bottom of the trough 10 and be guided by the tapered edges 93 and 94 of the guide strips 91 and 92, respectively, to the end of the slot 97 and drain into the funnel collector 98 and not further contaminate the chain 20 or the area surrounding the filling machine. In this regard the bottom or filling end of the trough 10 may be slightly tilted downwardly toward the right (see FIG. 8) so that the liquid 96 will readily run off through the slot 97 into the collector 98. The resulting filled containers C, since they are now placed in an upright position by the centering of the chain 20 at the right end of the machine may be directly moved onto the table top 100 which may be provided with a notch 101 for the end of the sprocket 20 and sprocket wheel 21, and it need not be provided with additional tongues which insert on either side of the sprocket chain 20, since the guides 91 and 92 have removed any tilt from the cans C as is shown in FIG. 9.

While there is described above the principles of this invention in connection with specific apparatus, it is to be clearly understood that this description is made only by way of example and not as a limitation to the scope of this invention.

I claim:
1. A conveyor comprising:
 (a) a rectangular U-shaped trough having
  (1) a continuous bottom,
  (2) two parallel sides, at least one side having an integral lower flange parallel to said bottom, and at least one side being adjustable relative to the other side,
  (3) a guide strip along at least one lower corner of said trough,
 (b) an endless chain slidable off center along said bottom and guided by said strip, and
 (c) means for driving said chain.
2. A conveyor according to claim 1 wherein said trough is made out of a low coefficient of friction high wear resistant material.
3. A conveyor according to claim 2 wherein said material is a fiber glass reinforced plastic.
4. A conveyor according to claim 1 wherein said conveyor is for containers such as bottles and cans which are substantially completely supported by said chain.
5. A conveyor according to claim 1 wherein said trough is substantially straight.
6. A conveyor according to claim 1 including a plurality of parallel troughs wherein adjacent troughs have common sides.
7. A conveyor according to claim 1 wherein said lower flange on one of said sides acts as said guide strip.
8. A conveyor according to claim 1 wherein said adjustable side has said lower flange and includes bolt means between said flange and said bottom, said bottom has parallel slots therein transverse of the length of said trough for enabling said adjustment between said parallel sides.
9. A conveyor according to claim 1 wherein said guide strip has a thickness less than that of said chain.
10. A conveyor according to claim 1 wherein said chain has a rough surface on which the bottoms of the containers conveyed by said conveyor are substantially completely supported.
11. A conveyor according to claim 1 wherein said endless chain comprises a sprocket type chain.
12. A conveyor according to claim 1 wherein said means for driving said chain comprises a motor.
13. A conveyor according to claim 1 wherein the means for driving said chain includes means for varying the speed of said driving means.
14. A conveyor according to claim 1 including a second guide means insertable into the end of said trough for providing support for the containers conveyed by said chain on both sides of said chain at the end of said conveyor.
15. A conveyor according to claim 1 including guide means for centering said chain in the bottom of said trough at the end of said trough.
16. A conveyor according to claim 1 including bridging trough section between two adjacent ends of two conveyors in series, said section having a continuous bottom and two parallel sides.
17. A conveyor according to claim 16 wherein said section includes a guide strip along one lower corner of its trough.

18. A conveyor according to claim 1 including an exit plate for the containers comprising a tongue insertable into the end of said conveyor on the opposite side of said chain from said guide strip for supporting the containers at the end of said conveyor in a substantially upright position.

19. A conveyor according to claim 1 wherein the spacing between the two parallel sides of said conveyor is between about 5% and 10% greater than that of the width of the containers being conveyed therein, whereby said off-center chain causes the containers to tilt transversely in said trough so as to contact only one of said parallel sides at substantially one point to reduce the amount of contact and friction between said trough and the containers.

20. A conveyor according to claim 1 wherein said bottom of said trough is slightly inclined and the lower end of said trough is provided with an aperture through which liquid material which may spill into said trough may be removed.

21. A conveyor comprising:
(a) a rectangular U-shaped straight trough made of fiber glass reinforced plastic for conveying similarly sized and shaped containers, having
  (1) a continuous bottom portion,
  (2) two parallel sides, at least one having an integral lower flange parallel to said bottom and one being adjustable relative to the other side, said sides being spaced between about 5% and 10% farther apart than the width of said containers so that said containers can be tilted between said sides as they move along said trough,
  (3) a guide strip along at least one lower corner of said trough,
(b) an endless sprocket type conveyor chain slidable along the bottom of said trough and guided by said strip, said chain having a thickness greater than the thickness of said guide strip, and guided by said strip off center from the line half way between said two parallel sides of said trough, whereby said containers are tilted in said trough by said chain, and
(c) means for driving said chain comprising a sprocket wheel near each end of said trough, and means for driving one of said sprocket wheels.

References Cited

UNITED STATES PATENTS 2,233,379   2/1941   Cope _____ 198—189

FOREIGN PATENTS 767,567   2/1957   Great Britain.

RICHARD E. AEGERTER, Primary Examiner

U.S. Cl. X.R.

198—204